Patented Sept. 23, 1952

2,611,485

UNITED STATES PATENT OFFICE 2,611,485

FROTHING AGENTS FOR FLOTATION OF ORES

Elmer C. Tveter, Walnut Creek, Calif., assignor to The Dow Chemical Company, Midland, Mich., a corporation of Delaware No Drawing. Application April 21, 1949, Serial No. 88,891

5 Claims. (Cl. 209—166)

The invention relates to new and improved frothing agents for use in processes for the froth flotation of ores.

Although a multiplicity of compounds has been disclosed in the art, which are said to be effective frothing agents, few of them have been adopted in commercial practice for reasons of cost, availability and performance. For practical reasons pine oil and cresylic acid have been most widely used and are generally regarded by the art as the standard frothing agents.

I have now found that the lower alkyl and phenyl mono-ethers of propylene glycol and of the poly-propylene glycols are highly effective frothing agents and that for many ores they show a marked superiority as compared with the standard frothers. These compounds are now available in good supply at a cost which permits their use in large scale ore-dressing operations.

Compounds which have been found useful as frothers according to the invention are the methyl-, ethyl-, propyl-, butyl-, and phenyl-mono-ethers of propylene glycol and of di-, tri-, tetra-, and higher, propylene glycols, as well as mixtures thereof. Instead of using the purified compounds for the purpose, reaction mixtures obtained by usual methods of making the compounds, or mixed fractions thereof, may also be used.

The aforesaid mono-ethers of propylene glycol and poly-propylene glycols may be made according to any of the methods known to the art. They are prepared by the reaction of an alcohol or phenol with propylene oxide according to the equation

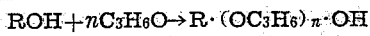
$$ROH + nC_3H_6O \rightarrow R \cdot (OC_3H_6)_n \cdot OH$$

where R represents a hydrocarbon radical and $n$ is the number of mols of propylene oxide used. The greater the value of $n$, the longer is the average chain length of the mono-ether produced. For carrying out the reaction the alcohol or phenol is placed in a closed reactor and a small amount of an alkali metal hydroxide, e. g. NaOH, is added as catalyst, on the order of about 0.5 to 1.0 per cent of the total weight of reactants. While heating the reactor to maintain the contents at a temperature between about 80° and 130° C., propylene oxide is gradually introduced at about the rate that reaction occurs. The reaction is carried out under substantially anhydrous conditions and at a moderate pressure, on the order of 20 to 30 pounds per square inch gauge. The reaction product is neutralized with acid, and may be distilled to remove more volatile components, leaving the glycol or polyglycol ether as a high boiling residue.

The mono-ethers of propylene glycol and poly-propylene glycols are effective producers of a strong froth possessing the physical properties required for supporting the mineral particles and permitting a clean separation from the gangue. As compared with the standard frothers, pine oil and cresylic acid, the new agents are capable of producing an equivalent froth with a materially smaller quantity of the frothing agent, hence are markedly superior in specific frothing power. In the case of many ores they show greater selectivity, producing a richer concentrate with a lower content of acid-insoluble gangue materials. The propylene glycol and poly-propylene glycol mono-ethers are not effective as mineral collectors, their function in the flotation process being solely that of frothing agent. The art has long recognized that it is disadvantageous for frothing agents to possess good collecting properties, as better selectivity is found when the two functions are separately performed by appropriate agents.

The following examples illustrate the improved results obtainable by use of the invention.

EXAMPLE 1

A series of tests was made with a sulphide copper ore assaying 4.03 per cent Cu. 600 gram samples of the ore were ground in a ball mill with 300 ml. of water and with lime in proportion of 5.0 pounds per ton of ore to prepare a pulp in which 56 per cent of the solids passed a 200 mesh screen. The pulp was conditioned in a flotation cell with potassium pentasol xanthate in amount of 0.025 pound per ton of ore, and with the amount of frothing agent shown in the following table, after which the concentrate was removed in 6 minutes of frothing. Table I shows the analysis of the concentrate and percentage recovery of copper. In one test pine oil was used as the frother for comparison.

Table I

| Frother | Lb./Ton of Ore | Concentrate | | Percent Cu Recovery |
|---|---|---|---|---|
| | | Cu Percent | Insol. Percent | |
| Pine oil | 0.09 | 21.9 | 15.1 | 92.4 |
| Tripropylene glycol phenyl ether | 0.06 | 23.0 | 13.5 | 92.2 |
| Propylene glycol n-butyl ether | 0.06 | 21.9 | 13.7 | 93.1 |
| Tripropylene glycol n-butyl ether | 0.06 | 21.8 | 12.8 | 93.2 |

The amounts of frother used in the tests were those required to produce approximately the same volume of froth. The tabulated results show 50 per cent greater amount of pine oil required than of the various propylene glycol ethers. Greater selectivity of the latter is also shown in the lower content of acid-insoluble material in the concentrate.

EXAMPLE 2

In similar manner a series of tests was made with a chalcocite ore assaying 1.06 per cent Cu. 500 gram samples were ground in a ball mill with 300 ml. of water and with lime at the rate of 6.0 pounds per ton of ore, to prepare a pulp with 65 per cent of solids passing a 200 mesh screen. The pulp was conditioned for one minute with 0.05 pound per ton of potassium ethyl xanthate and with the frother in amount shown in the table, and the concentrate was removed in 6 minutes of frothing. In this series both pine oil and cresylic acid were used for comparison, the amount of frother used in all cases being that required to produce approximately the same volume of froth. The results are shown in Table II:

*Table II*

| Frother | Lb./Ton of Ore | Concentrate | | Percent Cu Recovery |
|---|---|---|---|---|
| | | Cu Percent | Insol. Percent | |
| Pine oil | 0.07 | 11.4 | 38.1 | 78.6 |
| Cresylic acid | 0.13 | 11.6 | 36.6 | 79.3 |
| Propylene glycol phenyl ether | 0.08 | 12.3 | 29.9 | 78.0 |
| Dipropylene glycol phenyl ether | 0.08 | 11.5 | 33.7 | 80.2 |
| Propylene glycol n-butyl ether | 0.05 | 11.4 | 35.5 | 81.4 |
| Dipropylene glycol n-butyl ether | 0.05 | 11.4 | 33.1 | 84.2 |
| Tetrapropylene glycol n-butyl ether | 0.05 | 10.6 | 36.7 | 81.8 |
| Pentapropylene glycol n-butyl ether | 0.05 | 11.0 | 35.2 | 80.6 |

EXAMPLE 3

In this series of tests a lead-zinc sulphide ore, which assayed 3.8 per cent Pb and 5.8 per cent Zn, was floated in two stages to remove, first, a lead concentrate and then a zinc concentrate. The ore was crushed to pass a 10-mesh screen. Samples of 500 grams of the crushed ore were ground in a ball mill with 300 ml. of water, lime at the rate of 0.8 pound per ton of ore, zinc sulfate at the rate of 0.44 pound per ton, sodium cyanide at the rate of 0.16 pound per ton, and potassium ethyl xanthate at the rate of 0.03 pound per ton, to a pulp in which 70 per cent of the solids passed a 200-mesh screen. The pulp was conditioned for one minute with the frother as shown in the table and a lead concentrate was removed during 4 minutes of frothing. The pulp was then conditioned for 2 minutes with copper sulfate at the rate of 0.90 pound per ton, potassium ethyl xanthate at the rate of 0.10 pound per ton and the frother in amount shown in the table for the zinc concentrate. The zinc concentrate was removed during 6 minutes of frothing. In each case the volume of froth was approximately the same for each of the frothers tested. The results are shown in Table III, the test including both cresylic acid and pine oil for comparison.

EXAMPLE 4

Samples of the copper ore described in Example 1 were prepared and ground in similar manner, using lime at 7.0 pounds per ton and as collector a mixture of equal parts of sodium ethyl xanthate and potassium amyl xanthate at 0.04 pound per ton. The propylene glycol ether frothing agents used were in each case obtained from two different sources and were tested against pine oil for comparison, in the amounts shown in the table. The concentrates were removed in 6 minutes of frothing, the results being given in Table IV:

*Table IV*

| Frother | Lb./Ton | Concentrate | | Percent Cu Recovery |
|---|---|---|---|---|
| | | Cu Percent | Insol. Percent | |
| Propylene glycol isopropyl ether (a) | 0.047 | 21.0 | 14.0 | 92.5 |
| Propylene glycol isopropyl ether (b) | 0.048 | 21.4 | 14.7 | 92.3 |
| Dipropylene glycol isopropyl ether (a) | 0.058 | 20.1 | 14.4 | 93.6 |
| Dipropylene glycol isopropyl ether (b) | 0.055 | 20.4 | 15.8 | 93.4 |
| Pine oil | 0.068 | 21.4 | 16.3 | 92.2 |

Samples (a) and (b) obtained from separate sources.

EXAMPLE 5

In this series of tests the same copper ore was used as in Examples 1 and 4, which was prepared as in Example 4. As frothing agents mixed reaction products were used, as follows:

*PPG methyl ether.*—A mixture of poly-propylene glycol methyl ethers, principally the ether of tetrapropylene glycol, obtained as the still residue from the reaction product of propylene oxide and methanol, after distilling off the lower ethers.

*PPG isopropyl ether (1).*—The undistilled reaction product from 1.67 mols of propylene oxide and one mol of isopropanol, containing approximately 21.0 per cent of isopropanol, 19.0 per cent of propylene glycol isopropyl ether, and the balance a mixture of poly-propylene glycol isopropyl ethers.

*PPG isopropyl ether (2).*—The undistilled reaction product from 4 mols of propylene oxide and one mol of isopropanol, containing about 8.0 per cent of isopropanol, 7.0 per cent of propylene glycol isopropyl ether, and the balance a mixture of polypropylene glycol isopropyl ethers.

*Table III*

| Type Frother | Lbs./Ton of Ore | Product | Assay Percent | | | Distribution | |
|---|---|---|---|---|---|---|---|
| | | | Pb | Zn | Insol. | Percent Pb | Percent Zn |
| Cresylic acid | 0.08 | Pb Conc. | 43.3 | 13.4 | 14.2 | 91.4 | 18.9 |
| Do | 0.16 | Zn Conc. | 1.7 | 38.6 | 21.9 | 5.0 | 76.8 |
| Total | 0.24 | Tailing | 0.18 | 0.32 | | 3.6 | 4.3 |
| Pine oil | 0.05 | Pb Conc. | 42.9 | 12.8 | 16.6 | 90.6 | 18.2 |
| Do | 0.13 | Zn Conc. | 1.9 | 41.6 | 20.6 | 5.3 | 79.7 |
| Total | 0.18 | Tailing | 0.20 | 0.16 | | 4.1 | 2.1 |
| Tripropylene glycol mono-n-butyl ether | 0.03 | Pb Conc. | 40.6 | 15.2 | 14.4 | 91.0 | 23.1 |
| Do | 0.07 | Zn Conc. | 1.8 | 40.5 | 18.7 | 5.0 | 74.4 |
| Total | 0.10 | Tailing | 0.20 | 0.18 | | 4.0 | 2.5 |
| Dipropylene glycol phenyl ether | 0.05 | Pb Conc. | 46.0 | 11.6 | 15.3 | 89.4 | 15.4 |
| Do | 0.10 | Zn Conc. | 2.3 | 41.4 | 17.5 | 6.8 | 82.7 |
| Total | 0.15 | Tailing | 0.19 | 0.14 | | 3.8 | 1.9 |

These frothing agents were tested against pine oil as standard, in the amounts and with the results shown in Table V:

Table V

| Frother | Lb./Ton | Concentrate | | Percent Cu Recovery |
| --- | --- | --- | --- | --- |
| | | Cu Percent | Insol. Percent | |
| PPG methyl ether | 0.057 | 21.8 | 13.8 | 92.8 |
| PPG isopropyl ether (1) | 0.050 | 23.2 | 13.1 | 92.2 |
| PPG isopropyl ether (2) | 0.056 | 22.6 | 14.3 | 92.9 |
| Pine oil | 0.068 | 21.4 | 16.3 | 92.2 |

I claim:

1. In the concentration of ores by froth flotation, the method which comprises subjecting an aqueous pulp of the ore to froth flotation in the presence of a collector and of a frother composed essentially of a compound from the group consisting of the alkyl mono-ethers, having from one to four carbon atoms in the alkyl group, and phenyl monoethers of propylene glycol, the polypropylene glycols and mixtures thereof.

2. Method according to claim 1, in which the frothing agent consists essentially of methyl mono-ethers of propylene glycol and the polypropylene glycols.

3. Method according to claim 1, in which the frothing agent consists essentially of isopropyl mono-ethers of propylene glycol and the polypropylene glycols.

4. Method according to claim 1, in which the frothing agent consists essentially of butyl mono-ethers of propylene glycol and the poly-propylene glycols.

5. Method according to claim 1, in which the frothing agent consists essentially of phenyl mono-ethers of propylene glycol and poly-propylene glycols.

ELMER C. TVETER.

REFERENCES CITED

The following references are of record in the file of this patent:

UNITED STATES PATENTS

| Number | Name | Date |
| --- | --- | --- |
| 1,730,061 | Davidson | Oct. 1, 1929 |
| 1,970,578 | Schoeller | Aug. 21, 1934 |
| 2,228,929 | Von Reibnitz | Jan. 14, 1941 |

OTHER REFERENCES

Journal of Physical Chemistry, vol. XXXVI, January 1932, pages 132 to 137.